United States Patent [19]

Junier

[11] Patent Number: 5,269,493
[45] Date of Patent: Dec. 14, 1993

[54] BUTTERFLY VALVE

[75] Inventor: Marius R. Junier, Houston, Tex.

[73] Assignee: Triten Corporation, Houston, Tex.

[21] Appl. No.: 9,685

[22] Filed: Jan. 27, 1993

[51] Int. Cl.$^5$ ............................................. A16K 1/22
[52] U.S. Cl. ..................................... 251/305; 137/375
[58] Field of Search ......................... 251/305; 137/375

[56] References Cited

U.S. PATENT DOCUMENTS

| | | | |
|---|---|---|---|
| 4,079,747 | 3/1978 | Roberts | 137/371 |
| 4,303,094 | 12/1981 | Rothwell et al. | 251/305 X |
| 4,380,246 | 4/1983 | Carole et al. | 137/375 |
| 4,406,441 | 9/1983 | Luberch et al. | 251/305 X |

OTHER PUBLICATIONS

Triten Corporation Drawing No. 00010-1014, "1524 (60") Expander Inlet Butterfly Valve," Dec. 20, 1990, Sheet Nos. 1 of 2 and 2 of 2.

Brochure of TAPCO, Div. of Triten Corporation, "Tapco Butterfly Valves" Feb. 1987.

*Primary Examiner*—John C. Fox
*Attorney, Agent, or Firm*—Vaden, Eickenroht, Thompson, Boulware & Feather

[57] ABSTRACT

There is disclosed a butterfly valve having a body forming a continuation of the flowway in which it is installed, bearing housings mounted on the body to connect with side openings from the flowway, a stem rotatable in the bearing housings and extending into the flowway, and a disc rotatable with the stem within the flowway. The periphery of the disc is spaced from the flowway and engages stops about the flowway when the disc is transverse to the flowway. The inner ends of the bearing housings extend into annular recesses in the ends of the disc, and wear-resistant sleeves are received over the inner ends of the bearing housings to span the gaps between the disc and flowway adjacent the ends of the stops.

4 Claims, 3 Drawing Sheets

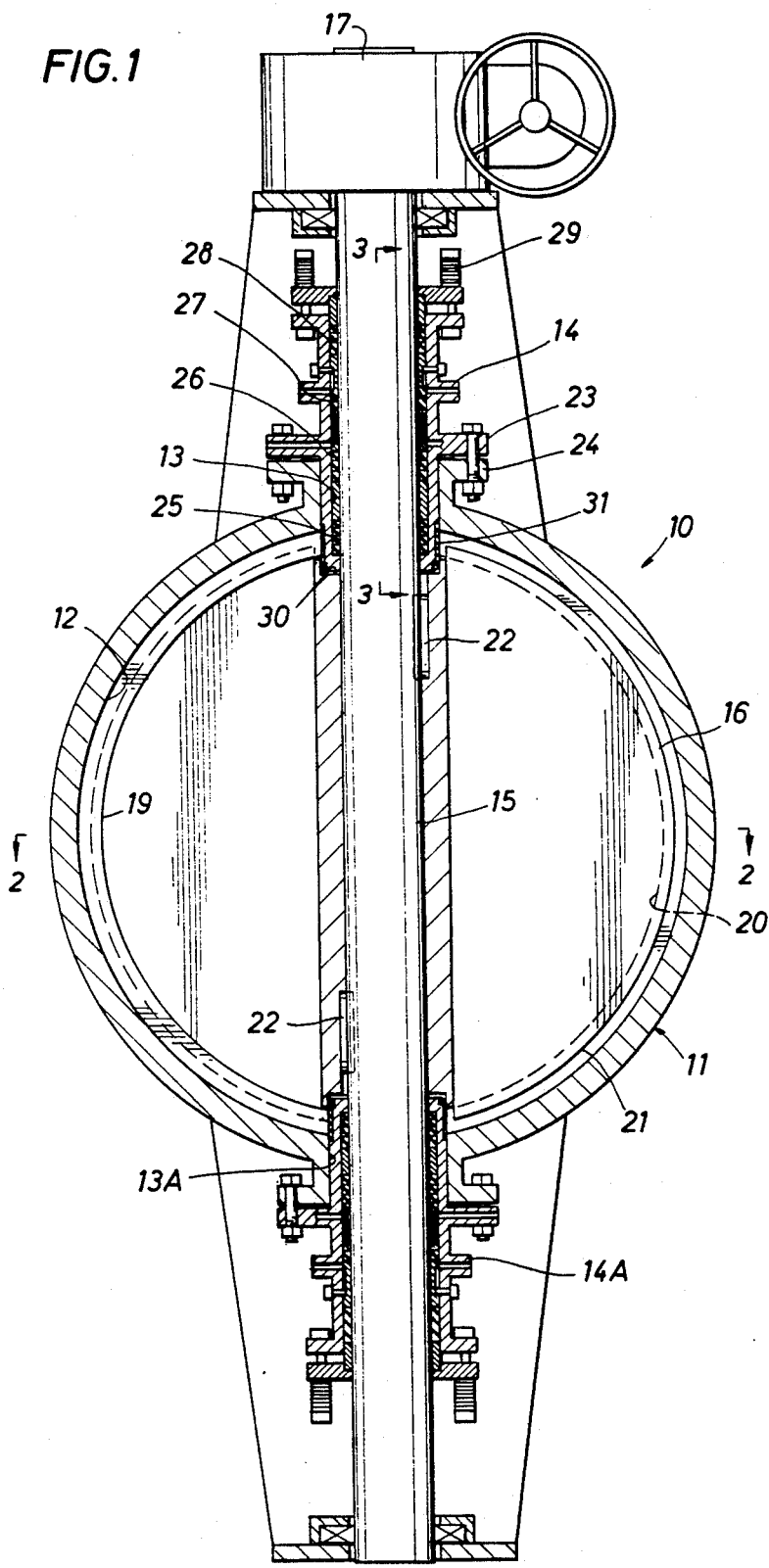

BUTTERFLY VALVE

This invention relates generally to a butterfly valve, and, more particularly, to an improved butterfly valve of a type which is especially well-suited for controlling the flow of hot gases or other fluids containing highly abrasive particles.

In a prior valve made and sold by the assignee of the present application, the disc is of a diameter which permits some clearance between its periphery and the flowway through the body of the valve in which the disc rotates, whereby the disc is free to radially expand and contract in response to extreme temperature fluctuations without binding in the flowway, and stops are formed about the flowway of the body to engage opposite sides of the disc when the disc is rotated to a closed position transverse thereto. More particularly, the disc is connected to a stem extending within bearing housings releasably connected to side openings in the body flowway so as to be rotatable with the stem between its opened and closed positions.

In order to resist wear due to abrasive line fluids, the periphery of the disc and the stops are covered with hard facing, and a sleeve of wear-resistant material fits tightly with an annular recess in each end of the disc to closely surround the stem. The sleeve extends into the side opening of the body so as to span the gap between the opening in the bearing housing and the disc at the adjacent ends of the stops in order to protect the portion of the stem which would otherwise be exposed to wear. More particularly, the inner end of the sleeve is spaced from the inner end of the recess so that the disc is free to move axially with respect to the stem.

In order to replace the sleeve as it becomes worn, the bearing housing must be removed to permit access to its outer end with a pulling tool of some type. In addition to being difficult to remove in this manner, the sleeve does not effectively seal between the stem and disc in the closed position of the valve, particularly in the event expansion and contraction of the parts of the valve move the stem off center.

It is therefore the object of this invention to provide a valve of this type having a protective sleeve which is easier to remove and thus replace when worn, and, more particularly, to provide a valve of this type which is of such construction as to reduce the likelihood of leakage past the disc in its closed position.

This and other objects are accomplished, in accordance with the preferred and illustrated embodiment of the invention, by a valve of the type described wherein the bearing housing has an inner end which extends through the side opening in the body and closely into the outer end of a recess in the disc but spaced from the inner end thereof, and the sleeve of wear-resistant material is received over the inner end of the bearing housing to span the gap beween the inner end of the body opening and the outer end of the recess adjacent opposite ends of the stops. Thus, the sleeve may be removed from the body opening along with the inner end of the bearing housing, upon release of the bearing housing from the body, to permit removal of the sleeve therefrom by pulling it from the inner end of the housing.

In accordance with another novel aspect of the invention, a ring is carried about the inner end of the bearing housing for sealably engaging between the inner end of the sleeve and the recess, thus closing off the small annular space between the sleeve and recess through which line fluid might otherwise leak when the disc is closed. More particularly, a packing assembly is carried within the bearing housing to closely surround the stem, and means are provided for axially compressing the packing assembly to tighten its engagement about the stem, whereby the stem is centered to insure uniform contact between the seal ring and the sleeve and recess.

In the drawings, wherein like reference characters are used throughout to designate like parts:

FIG. 1 is a longitudinal sectional view of a butterfly valve constructed in accordance with the present invention, and with the disc thereof shown in its closed position;

FIG. 2 is a cross-sectional view of the valve of FIG. 1, as seen along broken lines 2—2 thereof;

Figure 3:
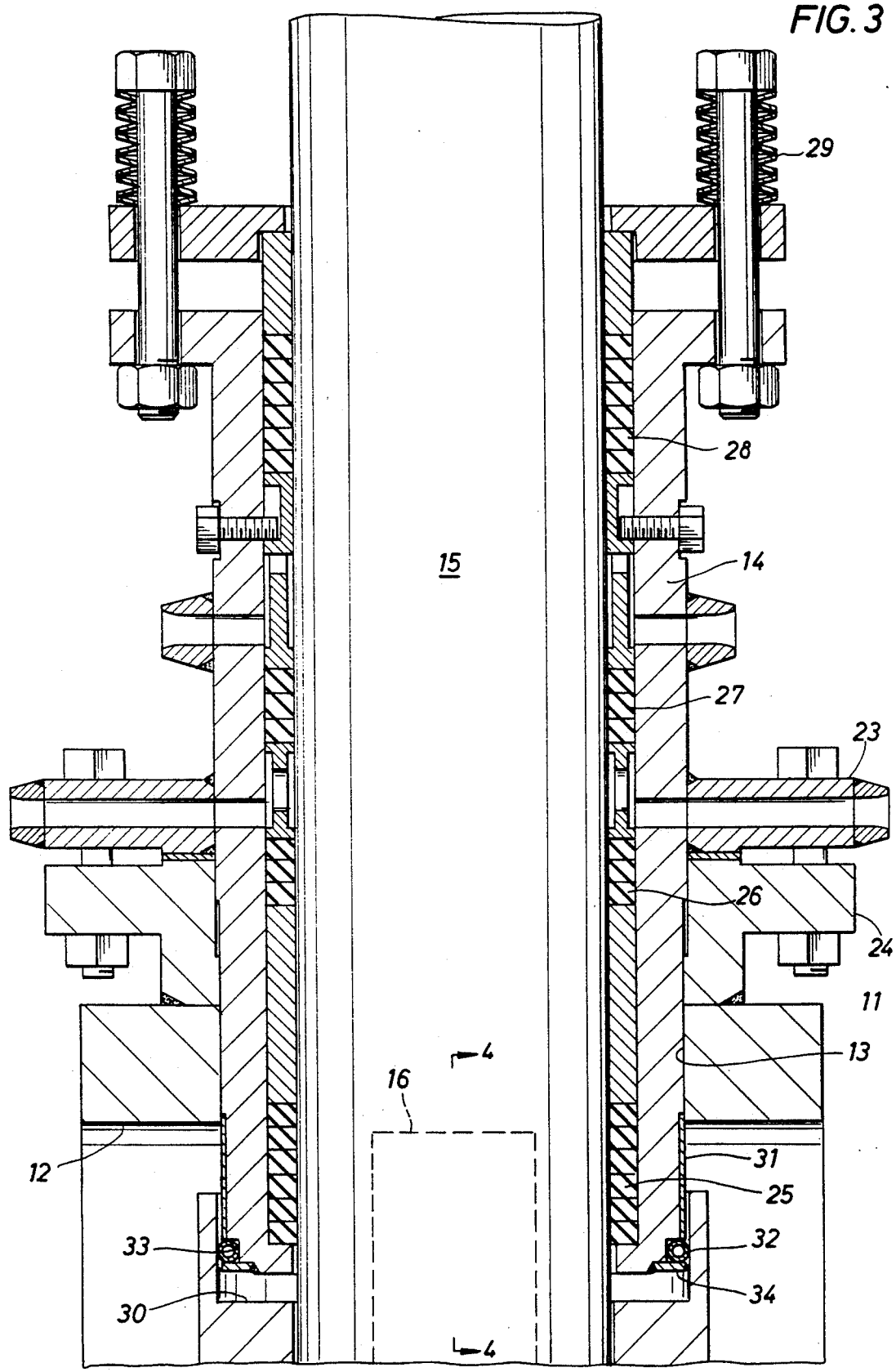
FIG. 3 is an enlarged longitudinal sectional view of the upper end of the valve of FIG. 1, as seen along broken lines 3—3 of FIG. 1, with the disc rotated to open position and showing the inner end of the bearing housing received within an annular recess about one end of the disc.

With reference now to the details of the above described drawings, the over-all valve, which is indicated in its entirety by reference character 10, is shown in FIG. 1 to comprise a body 11 having a flowway 12 therethrough whose opposite ends are adapted to be connected to a flowline to form a continuation thereof and an opening 13 from the side of the flowway 11. A bearing housing 14 is releasably connected to the housing with its bore therethrough extending from the flowway opening 13. More particularly, a stem 15 rotatable in the bearing housing extends into the housing bore, and a disc 16 is connected to the stem for rotation with it within the body flowway. The stem and, thus, the disc are caused to rotate by means of an operator 17 mounted on the upper end of the bearing housing.

In the illustrated embodiment of the invention, the body also has another opening 13A from the side of the flowway diametrically opposite the opening 13, and the opposite end of the stem 15 is rotatably mounted in a bearing housing 14A identical to the housing 14 and connected to the body to extend from opening 13A. Obviously, however, the invention contemplates that the stem may be supported in a bearing housing at only one end.

Stops 19 and 20 are formed on the flowway of the valve in transversely staggered relation so as to engage opposite sides of the periphery of the disc when the disc is moved to a position transverse to the flowway, as shown in FIG. 2, so as to locate the disc in its closed position. The periphery 21 of the disc is normally spaced from the flowway so that it is free to expand and contract due to the large differential between temperature of the line fluid and the ambient temperature about the valve.

More particularly, as shown, the disc is connected to the stem for rotation therewith by means of keys 22 which enable the assembly of the stem within the disc, and permit relative axial movement of the disc with respect to the stem to the limited extent described to follow, whereby the disc is free to move limited distances axially of the stem.

As shown, the bearing housing includes a stuffing box is of a construction similar to that shown in U.S. Pat. No. 4,899,899, assigned to the assignee of the present application, and which, as described in that patent, includes a series of packings carried in the bore of the housing for sealing about the stem and suitable means for axially compressing the packing assemblies. The invention contemplates, however, that the bearing housing may be of a different construction including one or more annular packings received within its annular space between the bore of the bearing housing and the stem.

As shown, the bearing housing has a lower flange adapted to be bolted or otherwise releasably connected to a flange 24 about the outer end of the housing opening 13 As more fully described in the aforementioned prior patent, a series of packings 25 to 28 received in the bore of the housing may be compressed either by coil springs 29 or by the admission of pressure fluid between adjacent packings.

As previously noted, each end of the disc has an annular recess 30 therein which surrounds the stem 15, and the bearing housing has an inner end which extends through the side opening 13 in the body and closely into the outer end of the recess 30. The inner end of the recess is, however, spaced from the inner end of the recess 30 so as to permit limited movement of the disc in the direction axially of the stem.

Figure 4:
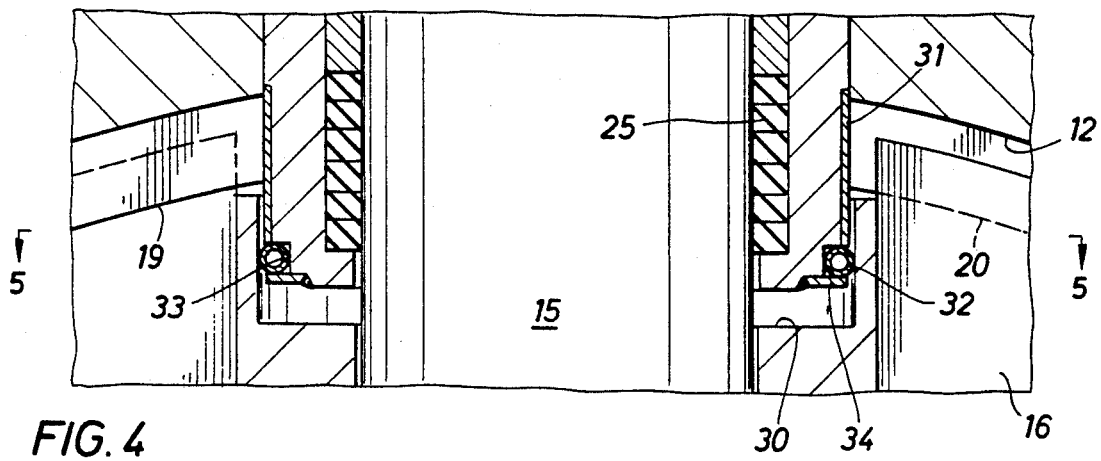
FIG. 4 is a partial sectional view similar to FIG. 3, but with the disc moved to closed position and showing the inner end of the bearing housing within the recess and the disc, as seen along broken lines 4—4 of FIG. 3.
Figure 5:
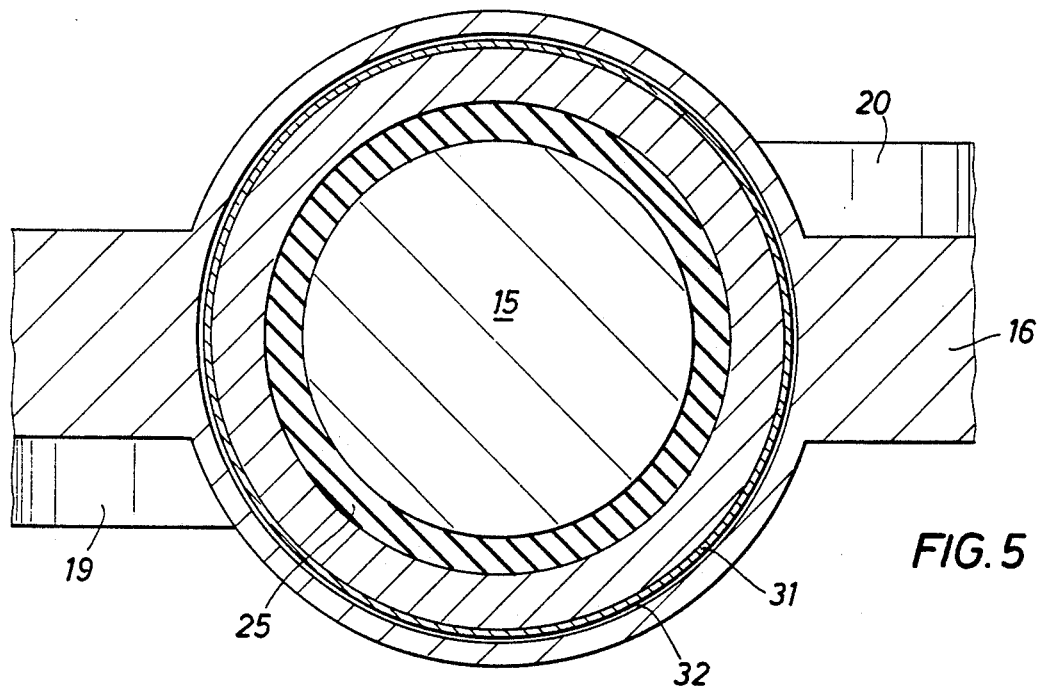
FIG. 5 is a cross-sectional view of a portion of the valve including the inner end of the bearing housing and recess in the disc, as seen along broken lines 5—5 of FIG. 4.
Figure 6:
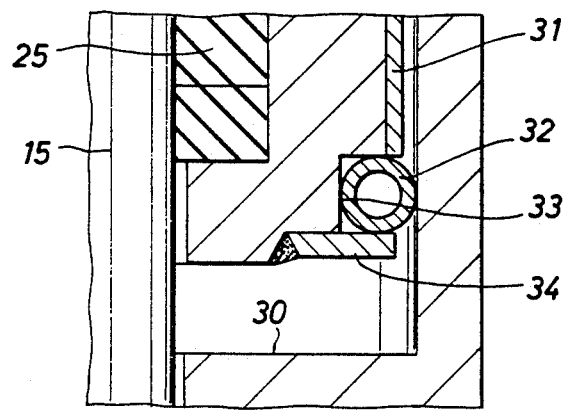
FIG. 6 is a still further enlarged, detailed sectional view of the inner end of the bearing housing received in the recess in the stem in the disc and the ring for sealing between them.

In accordance with one of the novel aspects of the present invention, a sleeve 31 of highly wear-resistant material, such as cobalt-based hard metal, is received over the inner end of the bearing housing. As best shown in FIGS. 1, 3 and 4, the sleeve spans the gap between the inner end of the body opening and the outer end of the recess adjacent opposite ends of the stops. Thus, the sleeve is positioned to reduce wear on the inner end of the housing due to line fluid impinging upon it. More particularly, the sleeve is removable along with the inner end of the bearing housing, upon release of the bearing housing from the body, whereby the sleeve may be pulled from the inner end of the bearing housing for replacement or repair.

A small annular space between the end of the sleeve and the outer end of the recess 30 is closed by means of a seal ring 32 carried within a groove 33 about the inner end of the bearing housing in position to be compressed between the bearing housing and recess in the disc, thus minimizing the possibility of leakage of line fluid therepast. As shown, the seal ring is a hollow metal ring which is retained in the groove 33 by means of an annular plate 34 welded or otherwise secured to the inner end of the bearing housing.

In order to remove the sleeve, the housing is first disconnected from the body flange, to permit its inner end to be removed from opening 13. If needed, a jack or similar device may be used to pry the adjacent surfaces of the flanges 23 and 24 apart. For this purpose, and as shown, the flanges are spaced from one another.

As previously described, the stuffing box of the bearing housing carries one or more packings between its bore and the stem, together with suitable means for compressing the packing. As a result, the stem is caused by the compressed packing to assume a centered position within the bore of the bearing housing to correct any misalignment of the stem due to relative expansion and contraction of the parts of the valve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A butterfly valve, comprising
   a body having a flowway therethrough adapted to be connected as part of a flowline and an opening from one side of the flowway,
   a bearing housing releasably connected to the housing and having a bore extending from the flowway opening,
   a stem extending through the bearing housing and into the housing bore for rotation therein,
   a disc connected to the stem for rotation therewith within the body flowway and having its outer periphery spaced from the flowway,
   said body having stops formed about its flowway to engage opposite sides of the disc in a position transverse to the flowway,
   said disc having an annular recess in at least one end surrounding the stem,
   said bearing housing having an inner end which extends through the side opening in the body and closely into the outer end of the recess in the disc but spaced from the inner end thereof, and
   a sleeve of wear-resistant material which is received over the inner end of the bearing housing to span the gap beween the inner end of the body opening and the outer end of the recess adjacent opposite ends of the stops,
   said sleeve being removable along with the inner end of the bearing housing from the body.

2. As in claim 1, including
   a ring carried about the inner end of the bearing housing for sealably engaging the outer end of the recess adjacent the inner end of the sleeve.

3. As in claim 2, including
   a packing assembly carried within the bearing housing to closely surround the stem, and
   means for axially compressing the packing assembly to tighten its engagement about the stem.

4. As in claim 1, including
   a packing assembly carried within the bearing housing to closely surround the stem, and
   means for axially compressing the packing assembly to tighten its engagement about the stem.

* * * * *